Patented Feb. 26, 1935

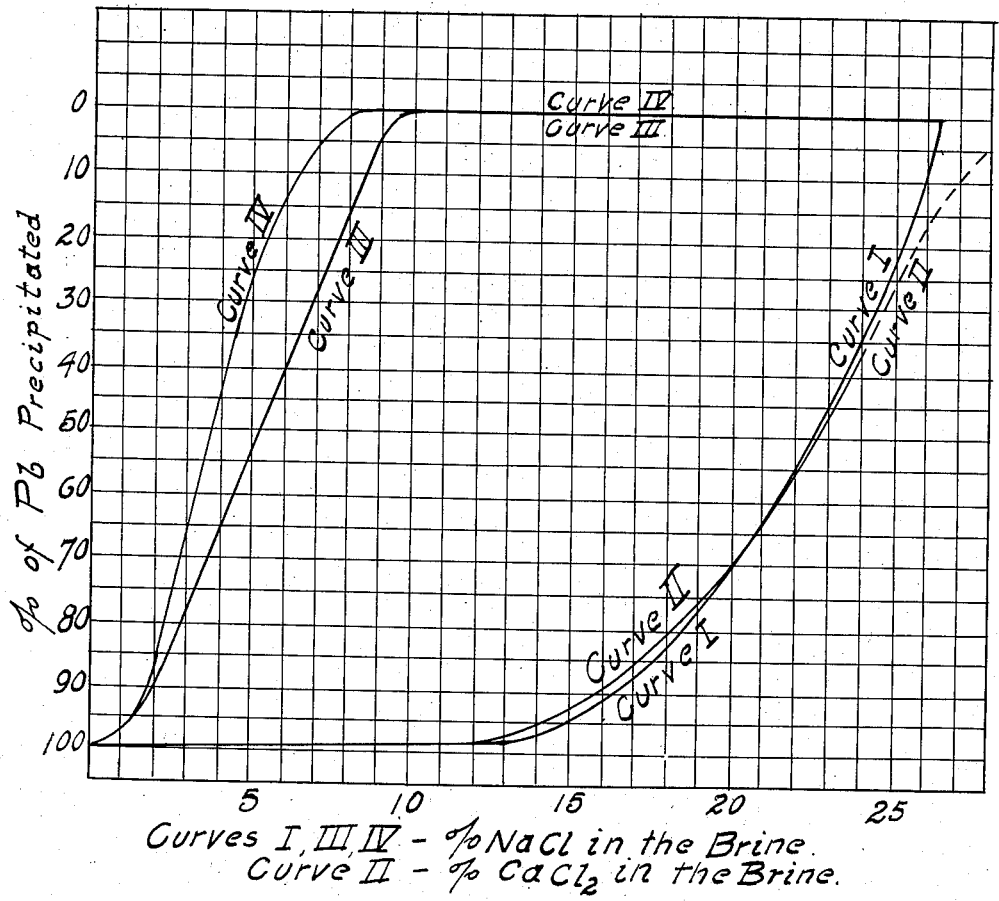

1,992,191

UNITED STATES PATENT OFFICE 1,992,191

PROCESS FOR THE MAKING OF WHITE-LEAD PIGMENTS

Niels C. Christensen, Salt Lake City, Utah

Application October 21, 1930, Serial No. 490,276

4 Claims. (Cl. 23—71)

This invention relates to processes for the manufacture of white lead pigments such as lead carbonate and basic lead carbonate, or white-lead, from lead chloride and lead chloride solutions. It is especially applicable and useful in the recovery and making of such lead products from the lead chloride or lead chloride solutions secured in the chloride brine leaching processes described in U. S. patents.

It is also applicable to the manufacture of such lead products from $PbCl_2$ and $PbSO_4$ from other processes.

The object of the invention is to produce these lead products directly from the treatment of lead ores or other lead products by the brine leaching processes mentioned above or directly from lead chloride and lead sulphate from other sources, without reduction of the lead to metallic form previous to its conversion to these lead salts and lead pigments.

By this invention it is possible to make white lead carbonate pigments equal or superior in whiteness, tinting strength and covering power to the white lead pigments produced from metallic lead by the corrosion processes now in common use and which also have all the desirable qualities as to oil absorption, workability, etc., possessed by the products of the older processes.

By my invention it is possible to produce white lead pigments varying in basicity from a substantially normal carbonate, $PbCO_3$, to the basic carbonate, $2PbCO_3\text{---}Pb(OH)_2$ (pure white lead) or a more basic product if desired. I have found that the qualities of tinting strength and hiding power increase with an increase in basicity of the lead carbonate product produced, being lowest in the normal lead carbonate $PbCO_3$ and increasing up to or beyond the ordinary basic carbonate $2PbCO_3\text{---}Pb(OH)_2$, and being highest in even more basic products.

Contrary to statements made in the literature on this subject, it is possible by the methods of this invention to secure a lead pigment of good quality as to tinting strength, hiding power, workability, oil absorption, etc., which has substantially the composition of the normal carbonate, $PbCO_3$, and which is substantially equal in the qualities mentioned to much of the white-lead now sold as basic lead carbonate or white lead.

It is not the object of my invention to produce the white lead products mentioned above for use only as paint pigments but also for use in manufacture of other lead products such as massicot, litharge, red lead, lead peroxide etc., which may readily be made directly from these lead carbonate salts in less time and at a considerably lower cost than is possible in their manufacture from metallic lead.

In the production of white lead carbonate products by this invention a number of different steps are involved, which may be used alone or in combination depending upon the nature of the final product it is desired to produce. The primary steps or processes are described first and thereafter various combinations of these steps to produce the particular lead carbonate products desired.

To produce the substantially normal lead carbonate, two different methods may be used, depending upon the temperature of the solutions used in the treatment of the lead chloride. Both of these methods involve the treatment of the lead chloride with calcium carbonate (or other alkaline earth carbonate) and water, either in solution or as an emulsion with water as briefly described in the following.

In experimenting with lead chloride solutions, I have found that the lead may be precipitated from the hot solution or the cold solution by means of calcium carbonate. The nature of the reaction and the character of the precipitate will be entirely different in the two cases. From a cold water solution of lead chloride the lead is precipitated as a lead-calcium chloro-carbonate as indicated in the following chemical equation:

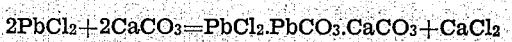

This reaction is complete and quite rapid and the lead may be practicallly completely precipitated from solution by this method. The double salt thus formed is however not stable in the presence of water but slowly decomposes forming lead carbonate and calcium chloride as indicated in the following chemical equation:

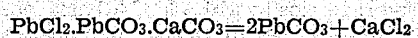

The first reaction in which the lead chloride is precipitated proceeds quite rapidly but the second reaction, in which the lead is completely converted to the carbonate, proceeds slowly, but is complete after several hours agitation with water.

Owing to the limited solubility of $PbCl_2$ in cold water, it is not very feasible to carry out this operation by dissolving all of the lead chloride in water at one time, and it is therefore desirable to treat the lead chloride in solid form with water and calcium carbonate to convert the chloride to the carbonate. This operation presents little difficulty if carried out by grinding the $PbCl_2$ and $CaCO_3$ together in water. During the grinding operation the first reaction results in the formation of a double salt as described above. The formation of this salt causes a coating of the CaCO₃ and so tends to slow up the reaction between the PbCl₂ in solution and the solid CaCO₃. The grinding action removes the coating from the CaCO₃ and allows the reaction to proceed to completion, the solid PbCl₂ dissolving in the solution as rapidly as the CaCO₃ precipitates the PbCl₂ in solution. The grinding and mixing action in a pebble mill allows the reaction to proceed to completion in the cold in from one-half to two hours. With warm solutions the time may be considerably reduced.

After completion of the reaction between the PbCl₂ and CaCO₃ to form the double salt, the conversion to PbCO₃ may be completed in the pebble mill (or other grinder) or the precipitated double salt may be removed from the mill and treated with fresh water to complete the reaction. Grinding during the completion of the reaction however gives a white lead product of higher tinting strength and hiding power than is obtained without the grinding. In either case it is preferable to change the solution in contact with the solids under treatment several times in order to hasten the reaction and to completely remove the calcium and chlorine from the final product. This may be carried out by filtering away the CaCl₂ solution (or settling out the solid product and decanting) and mixing with fresh water and agitating or grinding, this operation being repeated until the chlorine content of the product is reduced to the desired amount. This operation may be carried out in counter-current so as to reduce the amount of water used to a minimum and secure a strong calcium chloride solution. As noted in the following, too strong a CaCl₂ should not be used.

The above described process of converting PbCl₂ to PbCO₃ may be carried out in a water solution or in a chloride brine, providing the brine is not too concentrated. The first reaction in which the PbCl₂ is precipitated as a double salt with CaCO₃ as described proceeds most rapidly in a water solution and decreases in rapidity with increase in brine concentration. This effect is not sufficient to prevent the completion of the reaction until the brine concentration is quite high, above 20% NaCl or CaCl₂ (or combined salts) and increases in effect toward saturation. This effect is also more pronounced with increase in temperature of the solution so that with warm or hot solutions lower brine concentrations are preferred in carrying out the operation.

The PbCO₃ product formed in the process described above is a white product having good qualities as a paint pigment, the tinting strength, covering power and oil absorption being similar to these properties in white leads (basic lead carbonates) now on the market. The fact that this substantially normal carbonate has these properties is probably due to the method of manufacture in which it is slowly converted from the double salt to the carbonate, giving it physical properties which differ from the carbonate produced by rapid precipitation from solution or by the reaction of CO₂ with ground litharge.

As previously noted, grinding during the completion of the reaction which results in the formation of the lead carbonate improves the tinting strength and hiding power of the resultant product.

After completion of the reaction, the lead carbonate may be separated from the water solution by filtration and dried or may be made into paste with oil in the well known manner now in common use. The dried lead carbonate thus produced, as it comes from the drying operation has a relatively high oil absorption, but the oil absorption can be reduced to a relatively low point by a brief grinding operation in a suitable mill or grinder such as a pebble mill, the decrease in oil absorption being roughly proportional to the amount or time of grinding. By varying the grinding period products varying in oil consumption from relatively high to very low may thus be secured.

The utilization of the above process in connection with the chloride brine leaching processes for treating lead ores mentioned early in this specification may be conducted in a number of different ways. If desired the PbCl₂ may be precipitated from the pregnant chloride brines used in these processes by dilution and cooling of these solutions, and the solid lead chloride so produced may be treated as described above. If desired, the lead may be precipitated from the chloride brines directly as a double salt of lead chloride and calcium carbonate by diluting and cooling the concentrated pregnant chloride brine and adding CaCO₃ and agitating or grinding the mixture. If the pregnant brine carries much PbCl₂ in solution, dilution and cooling will precipitate part of the lead chloride as such. This lead chloride may be converted to the double salt and the residual PbCl₂ in solution may be precipitated as the double salt by adding the required amount of CaCO₃ and grinding the mixture of solids and solution as described above. The concentrated pregnant brine should be diluted with cold water before the precipitation if it is desired to precipitate the normal lead-calcium-chloro-carbonate as the basic lead-calcium-chloro-carbonate will be precipitated if the solution is very hot or boiling, as later described. The double salt thus formed is then preferably separated from the brine solution by settling or filtration and converted to the carbonate by treatment with water as described above.

Lead sulphate may be converted to the carbonate by dissolving it in a sodium chloride brine (or CaCl₂) and treating the resulting lead chloride solution as described above. This step in the process is treated more fully below.

If calcium carbonate is added to a hot lead chloride solution at or near the boiling point of the solution, the lead is completely precipitated but the reaction and resulting product are different from those with a cold lead chloride solution. From the hot or boiling solution the lead is precipitated as a basic lead calcium chloro-carbonate as indicated in the following chemical equation, part of the CO₂ being driven off during the reaction:

$$2PbCl_2 + 2CaCO_3 + H_2O = PbCl_2 \cdot Pb(OH)_2 \cdot CaCO_3 + CaCl_2 + CO_2$$

This reaction proceeds rapidly in a boiling water solution of PbCl₂ there being a vigorous evolution of CO₂ until the reaction is complete. In a hot saturated NaCl brine there is no such reaction between the PbCl₂ and the CaCO₃ so that with hot concentrated or saturated chloride brines this method of precipitating the lead cannot be used. In dilute chloride brines the reaction proceeds rapidly to completion. The reaction is slowed up and inhibited with increase in concentration of the brine and almost entirely stopped in very concentrated or saturated brine. The effect of the brine concentration is shown in the accompanying curves I and II. The coordinates of I are per cent NaCl in solution and grams Pb left in 100 cc. of solution originally approximately saturated with $PbCl_2$. The coordinates of II are per cent $CaCl_2$ in solution and grams Pb left in 100 cc. of solution originally approximately saturated with $PbCl_2$. In running the tests to secure the points on these curves, slightly more than a chemical equivalent of $CaCO_3$ to the $PbCl_2$ in solution was added to the boiling solution which was then boiled until any reaction between the $CaCO_3$ and $PbCl_2$ was practically completed. The solids were then filtered out and the solution analyzed for Pb.

As will be seen from the curves, in solutions carrying up to 10% NaCl substantially all of the lead is precipitated from solution as the basic lead-calcium-chloro-carbonate. In solutions carrying above 10% NaCl the completeness of precipitation decreases slowly with increase in NaCl concentration up to nearly 17½% NaCl and above this point the decrease in the completeness of precipitation varies almost directly in proportion to the increase in NaCl concentration until with saturated or nearly saturated NaCl solutions practically none of the lead is precipitated. In $CaCl_2$ brines up to a 7½% brine substantially all of the lead is precipitated. In solutions above this point up to 17½% the completeness of precipitation decreases slowly and above this point decreases rapidly until with very concentrated brines practically no lead is precipitated.

The compound precipitated from the boiling lead chloride solutions as described has approximately the composition noted above, i. e., $PbCl_2Pb(OH)_2.CaCO_3$, though the exact composition will vary slightly from that given according to whether the $PbCl_2$ or $CaCO_3$ is in excess. With an excess of $PbCl_2$ the salt may be slightly more basic. For example, if enough $CaCO_3$ is added to the boiling $PbCl_2$ solution to precipitate the basic chlorocarbonate and $PbCl_2$ is thereafter added to the solution in which the precipitate is suspended, the $PbCl_2$ will react with the $CaCO_3$ in the basic compound and drive off $CO_2$ to form a compound containing more $Pb(OH)_2$. This method of precipitation may therefore be used to make the more basic lead carbonate pigments, the $CaCO_3$ and $PbCl_2$ being added in successive batches in such a manner as to secure the most basic compound possible. The basic lead-calcium-chloro-carbonate may also be made from the solid lead chloride by mixing it with the proper proportion of finely divided calcium carbonate and treating the mixture with hot or preferably boiling water, and also preferably grinding and agitating the mixture as previously described. This basic compound is not stable and when treated with hot or cold water slowly decomposes into a mixture of basic carbonate, $2PbCO_3Pb(OH)_2$ and $Pb(OH)_2$ as indicated in the following chemical equation:

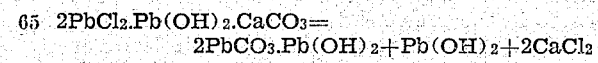
$$2PbCl_2.Pb(OH)_2.CaCO_3 = 2PbCO_3.Pb(OH)_2 + Pb(OH)_2 + 2CaCl_2$$

This decomposition is relatively very slow, but can be hastened by using hot water and changing the water as the $CaCl_2$ content increases and particularly by grinding which removes the solid decomposition products which tend to coat the original salt. If the basic chlorocarbonate did not decompose in the manner described it might be used as a paint pigment as it is a white compound with good tinting strength and covering power.

The basic lead-calcium chloro-carbonate may be completely converted to the normal carbonate by treatment with $CO_2$ in an emulsion with water as indicated in the chemical equation given below:

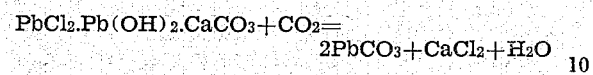
$$PbCl_2.Pb(OH)_2.CaCO_3 + CO_2 = 2PbCO_3 + CaCl_2 + H_2O$$

This treatment is best carried out in an emulsion of the basic lead-calcium-chloro-carbonate with water or a dilute brine as concentrated (and particularly hot concentrated) brines tend to prevent complete precipitation of the lead as a carbonate. The $CO_2$ driven off during precipitation of the basic lead-calcium-chloro-carbonate may be used for this conversion of the basic double salt to lead carbonate and thus avoid the necessity of securing much of the $CO_2$ from other sources for this purpose. The conversion to the carbonate is best carried out in a suitable spray chamber in which the fluid pulp mixture is sprayed into the $CO_2$ atmosphere. The normal carbonate thus produced may be used in the making of the basic lead carbonate as described below.

This basic lead-calcium-chloro-carbonate, made by precipitation from the hot solutions as described above, is used in my invention for the preparation of basic lead carbonate or white lead. This process may be carried out in two general ways as follows:

The basic lead-calcium salt is mixed with $PbCl_2$ and $CaCO_3$ in the proportions to form the basic carbonate or white lead and the mixture is thoroughly ground for a period of from one-half to two hours, and then agitated with water which is changed at intervals as the $CaCl_2$ concentration increases. This treatment results in the slow change of the salts in the mixture to basic lead carbonate and $CaCl_2$ as indicated in the following chemical equation:

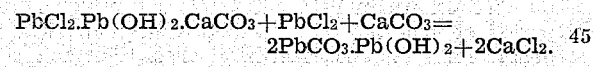
$$PbCl_2.Pb(OH)_2.CaCO_3 + PbCl_2 + CaCO_3 = 2PbCO_3.Pb(OH)_2 + 2CaCl_2.$$

forming an excellent white pigment of high tinting strength and covering power. By varying the proportions of the basic lead-calcium salt and the $PbCl_2$ and $CaCO_3$ a white lead of any desired basicity may be secured, varying from the normal carbonate, formed by the reaction between the $PbCl_2$ and $CaCO_3$ alone as described in the first part of the specification, to the basic carbonate just described, or an even more basic mixture may be formed by using an excess of the basic lead-calcium chloro-carbonate. As previously noted, by treating the basic lead-calcium-chloro-carbonate with water a compound (or mixture) more basic than the ordinary basic lead carbonate (being one molecule of carbonate to one molecule of hydroxide). The decomposition of the basic chloro-carbonate by water is slow in cold water but if carried out in water which is too hot, i. e., near the boiling point, there is a chemical change which gives the pigment a light yellow color. The reaction is also much hastened by grinding during the treatment. The white lead pigment thus formed has a much higher tinting strength and hiding power than the ordinary basic lead carbonate, but care must be taken in drying not to heat much above 90° C. or else the pigment loses its white color, and turns a light yellow. All of the compounds or mixtures of this series are excellent white paint pigments, but the tinting strength and hiding power increase with the increase in basicity from the normal carbonate to the fully basic carbonate and is highest in the compounds (or mixtures) more basic than the basic carbonate $$2PbCO_3.Pb(OH)_2.$$

To complete this process and remove practically all of the chlorine from the resultant compound requires a relatively long period of treatment from several hours to two or three days depending upon the manner in which it is carried out. With warm water the reaction is more rapid than with cold water. Changing the water as the $CaCl_2$ concentration builds up also hastens the reaction. Grinding at intervals or continuously during the treatment considerably shortens the time necessary for completion of the reaction and gives a product of higher tinting strength and hiding power. Complete removal of all the last small amount of chlorine is not necessary unless the product is to be used for making oxides free from chlorine. A very small amount of chlorine in the white pigments seems to increase their tinting strength and hiding power.

To remove the last of the chlorine a period of several days' gentle agitation or "soaking" in water is necessary. By this method practically all the chlorine may be removed (as $CaCl_2$) giving a product of the highest purity in this regard.

After the removal of most of the chlorine ($CaCl_2$) by grinding and agitation, the residual chlorine is best removed by brief grinding periods alternating with long periods of agitation or "soaking" with water. After completion of the reaction the solution may be filtered away from the compound and the latter may be dried or the required amount of linseed oil (or other oil) may be added to the wet mixture and incorporated therewith to form a white lead paste in the well known manner now in common use.

The pigment, thus made, as it comes from the drier has a relatively high oil absorption but the oil absorption can be greatly reduced by a brief period of grinding in a suitable mill such as a pebble mill, the decrease in oil absorption being roughly proportional to the amount of grinding or time of grinding. By thus varying the grinding time, white lead pigments of different oil absorption may be made varying from relatively high in the dried but unground pigment to relatively low in the thoroughly ground pigment.

It will be apparent that the process may be carried out in a number of different ways as to detail of operation. For example, all the $CaCO_3$ required may be added to the lead chloride solution in the precipitation of the basic lead-calcium-chloro-carbonate and the required amount of $PbCl_2$ may be added to this mixture before grinding and treatment with water as described.

The process may also be carried out by first preparing the normal lead carbonate by either of the methods described above and the basic lead-calcium-chloro-carbonate as described and then mixing these in the desired proportions and grinding and treating with water as described. During this treatment the mixed salts react to form the basic carbonate as indicated by the following chemical equation:

$$PbCl_2.Pb(OH)_2.CaCO_3 + PbCO_3 = 2PbCO_3.Pb(OH)_2 + CaCl_2$$

By varying the proportions of basic lead-calcium-chloro-carbonate and lead carbonate white lead mixtures of varying basicity may be secured, varying in tinting strength and covering power as previously described. As previously noted grinding gives a product of higher tinting strength and hiding power.

The basic lead carbonates or basic lead carbonate mixtures of varying basicity may also be made from the normal lead carbonate in the three following general ways.

The normal carbonate, $PbCO_3$, may be made from $PbCl_2$ or $PbCl_2$ solution by treatment with $CaCO_3$ by the methods described in the first part of this specification. This normal carbonate may then be slowly changed to the basic carbonate by treatment with boiling water or steam, the normal carbonate being slowly converted to the basic carbonate as indicated in the following chemical equation:

$$3PbCO_3 + H_2O = 2PbCO_3.Pb(OH)_2 + CO_2$$

This decomposition of the normal carbonate, prepared as described above, by treatment with boiling water, is relatively slow requiring several hours for completion. In this regard it will be seen that the normal carbonate prepared by the methods herein described differs entirely from the normal carbonate secured by ordinary methods of precipitation. Grinding during the treatment considerably increases the rapidity of the conversion. By boiling the normal carbonate made as described, for different periods, mixtures of varying basicity may be secured varying from the normal carbonate $PbCO_3$ to the fully basic carbonate $2PbCO_3.Pb(OH)_2$. These products also show the increase in tinting strength and hiding power with increase in basicity previously mentioned. Grinding during the conversion gives a product of increased tinting strength and hiding power.

The basic lead carbonate may also be formed directly from the lead chloro-calcium carbonate by treating it with hot or preferably boiling water, or hot water and steam, thus driving off $CO_2$ and making calcium chloride and forming the basic lead carbonate as indicated in the following chemical equation:

$$3(PbCl_2.PbCO_3.CaCO_3) + 2H_2O = 2(PbCO_3).Pb(OH)_2 + 3CaCl_2 + 2CO_2$$

This operation is preferably carried out while grinding during the treatment.

The basic lead carbonate may also be prepared by mixing the lead chloride and calcium carbonate in the proper proportions and grinding in the presence of hot or boiling water or hot water and steam, thus driving off $CO_2$ and making calcium chloride in solution and forming the basic lead carbonate as indicated in the following chemical equation:

$$3PbCl_2 + 3CaCO_3 + H_2O = 2PbCO_3.Pb(OH)_2 + 3CaCl_2 + CO_2$$

Changing the hot solution for fresh water at intervals during the treatment is preferable as noted in the previous descriptions.

The basic lead carbonate and basic lead carbonate mixtures may also be formed from the normal carbonate and lead hydroxide or lead oxychloride as described in the following. The normal lead carbonate prepared as described in the first part of this specification is mixed with $Pb(OH)_2$ in the proper proportion and the mixture is ground and treated with water as previously described. This treatment of the mixture results in the slow formation of the basic lead carbonate as indicated in the following chemical equation:

$$2PbCO_3 + Pb(OH)_2 = 2PbCO_3 \cdot Pb(OH)_2$$

The basic compound thus slowly formed is an excellent pigment, its properties being apparently due to the method of formation in which it is very slowly formed. By varying the proportions of hydroxide and carbonate white leads of varying basicity may be secured as previously described.

The foregoing process is preferably carried out by mixing the $PbCl_2$, $CaCO_3$ and $Ca(OH)_2$ in the required (or desired) proportions and then grinding the mixture and treating with water as described, this mixture as a result of this treatment being slowly converted to the basic lead carbonate as indicated by the following chemical equation:

$$3PbCl_2 + 2CaCO_3 + Ca(OH)_2 = 2PbCO_3 \cdot Pb(OH)_2 + 3CaCl_2$$

By varying the proportions of $CaCO_3$ and $Ca(OH)_2$ white lead mixtures of different basicities may be secured as described above.

In the precipitation of chloride solutions with calcium hydroxide, oxychlorides or hydroxychlorides may be formed. If these are mixed with $PbCl_2$ and $CaCO_3$ (or the $PbCl_2$ and $PbCO_3$ prepared as described) in the proper proportion and ground and treated with water as described, the resultant product is the basic lead carbonate. The reaction occurring in the mixture is indicated in the following typical chemical equations:

$$2Pb(OH)Cl + PbCl_2 + 2CaCO_3 = 2PbCO_3 \cdot Pb(OH)_2 + 2CaCl_2 + H_2O$$

$$2Pb(OH)Cl + PbCO_3 + CaCO_3 = 2PbCO_3 \cdot Pb(OH)_2 + CaCl_2 + H_2O$$

Any of the oxychloride compounds of lead may thus be converted to the basic carbonate by mixing with the proper proportions of $PbCl_2$ and $CaCO_3$ and grinding the mixture and treating with water as described. Basic lead carbonate mixtures or compounds of varying basicity may be secured by varying the proportion of the different ingredients as previously described.

It will be apparent from the foregoing that other combinations of the different steps of making basic lead carbonate or basic lead carbonate mixtures from lead chloride may be used, the essential part of each method being that the mixture contain the proper proportions of lead and calcium compounds containing the proper proportions of $CO_3$ and $(OH)_2$, for example, of the basic lead-calcium-chloro-carbonate and $PbCl_2$ and $CaCO_3$, or basic lead calcium-chloro-carbonate and normal carbonate $PbCO_3$, or $PbCl_2$ and $CaCO_3$ and $Ca(OH)_2$, or $PbCO_3$ and $PbCl_2$ and $Ca(OH)_2$, or $Pb(OH)Cl$ and $PbCl_2$ and $CaCO_3$, etc., in the proper proportion. Treating these mixtures by grinding and agitating with water as described, preferably grinding the mixture with water and thereafter agitating with water as described, preferably grinding the mixture with water, and changing the water at intervals, or grinding and agitating the mixture with water and changing the water at intervals to remove the $CaCl_2$ formed, gives the products described. In all these methods grinding during the conversion to the carbonate or basic carbonate increases the tinting strength and hiding power of the product.

The different lead carbonate compounds or mixtures mentioned in the foregoing may also be made from lead sulphate by the methods described by first converting the lead sulphate to lead chloride either in solution or as a solid. The conversion of the lead sulphate to lead chloride may be brought about by dissolving the $PbSO_4$ in a hot concentrated and preferably slightly acid chloride brine, preferably NaCl (or $CaCl_2$ if desired). By diluting and cooling a concentrated $PbCl_2$ solution made in this way the $PbCl_2$ may be precipitated and recovered in the solid form and may be used for the manufacture of the lead carbonates by the methods previously described. By diluting such a concentrated chloride brine containing $PbCl_2$ and treating with $CaCO_3$ as described above the lead may be precipitated either as the lead-calcium-chloro-carbonate or as the basic lead-calcium-chloro-carbonate, as described in the foregoing, which salts may be utilized for the production of the different lead carbonates as previously described. In the use of lead sulphate for these purposes it is necessary to take precautions to prevent the precipitation of $CaSO_4$ with the $PbCl_2$, $PbCl_2 \cdot PbCO_3 \cdot CaCO_3$, or $PbCl_2 \cdot Pb(OH)_2 \cdot CaCO_3$, since the $CaSO_4$ will react with the $PbCl_2$ in these salts in contact with water or dilute brines to form $PbSO_4$ as indicated in the following chemical equation:

$$PbCl_2 + CaSO_4 = PbSO_4 + CaCl_2$$

This reaction does not occur in a concentrated brine but does occur in water or dilute brines. The effect of brine concentration on the reaction is shown in curves III and IV. The coordinates of these curves are percent NaCl in the brine and percentage of the total lead Pb precipitated from a $PbCl_2$ solution as $PbSO_4$ or converted to $PbSO_4$ by addition of a small excess of $CaSO_4$. III is for a clean NaCl brine. IV is for a NaCl brine containing one-half of one percent of HCl. As will be noted from curve III, there is no precipitation of $PbSO_4$ by $CaSO_4$ in solutions containing above 10% NaCl, whereas below this concentration the percentage of the lead in solution which is precipitated or held out of solution as $PbSO_4$ by the $CaSO_4$ increases almost directly as the brine concentration decreases, until in a water solution the lead chloride is all converted to $PbSO_4$. As shown in curve IV, the addition of a small amount of HCl lowers the brine concentration necessary to prevent the reaction between the $PbCl_2$ and $CaSO_4$ to approximately eight percent NaCl. Addition of more HCl still farther lowers this required brine concentration. Where $CaSO_4$ is present or may be formed, brines should therefore not be diluted below these points (8 or 10% NaCl) in the manufacture of $PbCl_2$ from $PbSO_4$, if a pure $PbCl_2$ product is desired.

From the curves I and III, it will be apparent that to precipitate a pure basic lead-calcium-chloro-carbonate from a brine containing $CaSO_4$ in solution, the brine should not be diluted below 10% NaCl to prevent contamination with $PbSO_4$, and that the concentration of NaCl should not be much higher than 12½% in order to secure substantially complete precipitation of the $PbCl_2$ as the basic lead-calcium-chloro-carbonate.

Precautions must also be taken in the leaching of lead ores with NaCl brines containing $CaCl_2$ to which $H_2SO_4$ is added to form the leaching solution, to prevent precipitation of $CaSO_4$ with the $PbCl_2$ in the cooling and dilution of the pregnant solution, since in the later treatment of the $PbCl_2$ with water the $CaSO_4$ will react with the $PbCl_2$ to form $PbSO_4$.

Having described my process what I claim and desire to patent is:

1. The process of making lead carbonate from lead chloride which consists in making lead-calcium-chloro-carbonate by treating lead chloride with calcium carbonate and water and washing out the calcium chloride formed in said treatment and thereafter treating said chloro-carbonate with water and thereby making calcium chloride in solution and forming lead carbonate.

2. The process of making lead carbonate from lead in a chloride solution which consists in precipitating the lead as a lead-calcium-chloro-carbonate by means of calcium carbonate and separating said precipitate from the solution and thereafter treating said chloro-carbonate with water and thereby making calcium chloride in solution and forming lead carbonate.

3. The process of making basic lead carbonate from lead chloride which consists in making lead-calcium-chloro-carbonate by treating lead chloride with calcium carbonate and water and thereafter treating said chloro-carbonate with hot water and thereby making calcium chloride in solution and forming basic lead carbonate.

4. The process of making basic lead carbonate from lead chloride in solution which consists in precipitating the lead as a lead-calcium-chloro-carbonate with calcium carbonate and separating said precipitate from the solution and treating said precipitated chloro-carbonate with hot water and thereby making calcium chloride in solution and forming basic lead carbonate.

NIELS C. CHRISTENSEN.